E. M. LOGAN & C. E. McNAUGHTON.
POWER TRANSMISSION MECHANISM FOR MOTOR VEHICLES.
APPLICATION FILED MAR. 7, 1914.
1,189,709.
Patented July 4, 1916.
3 SHEETS—SHEET 1.
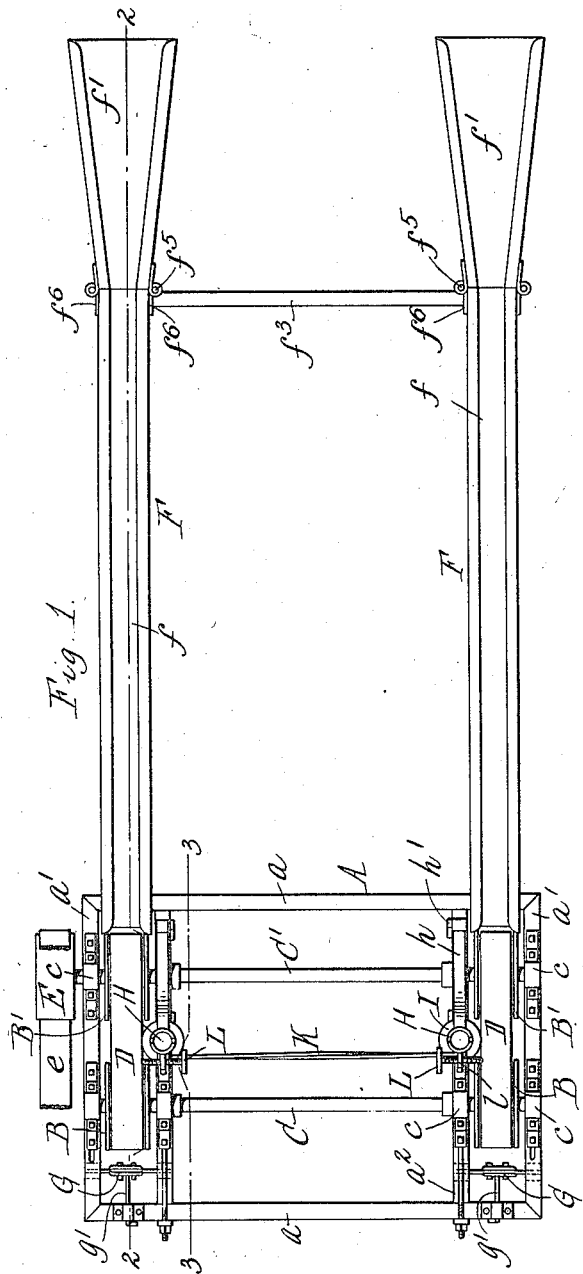
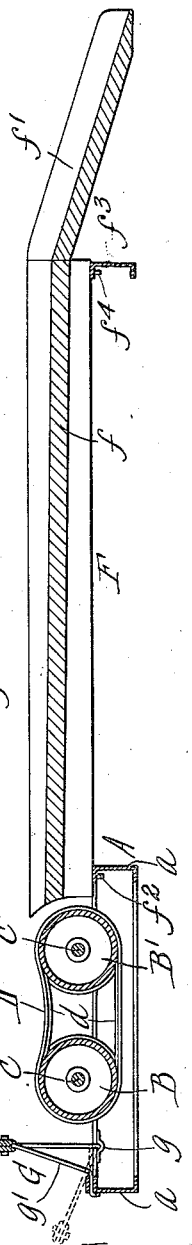
Witnesses:—
Alfred Borkenhagen
A. L. McGee.
Inventors
Edward M. Logan and
Clarence E. McNaughton
by Wilhelm & Parker
Attorneys.

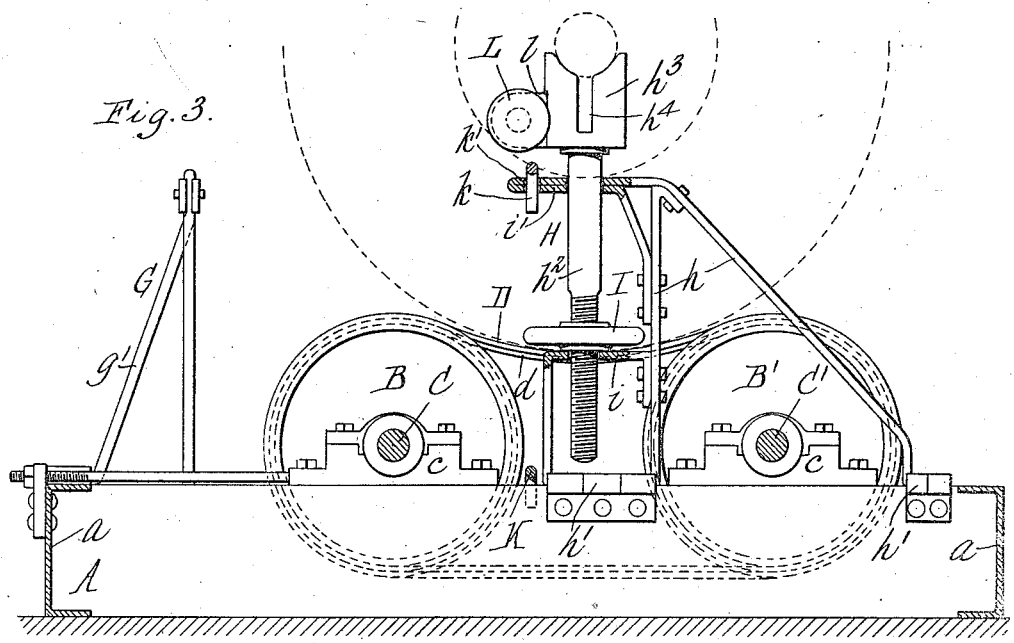
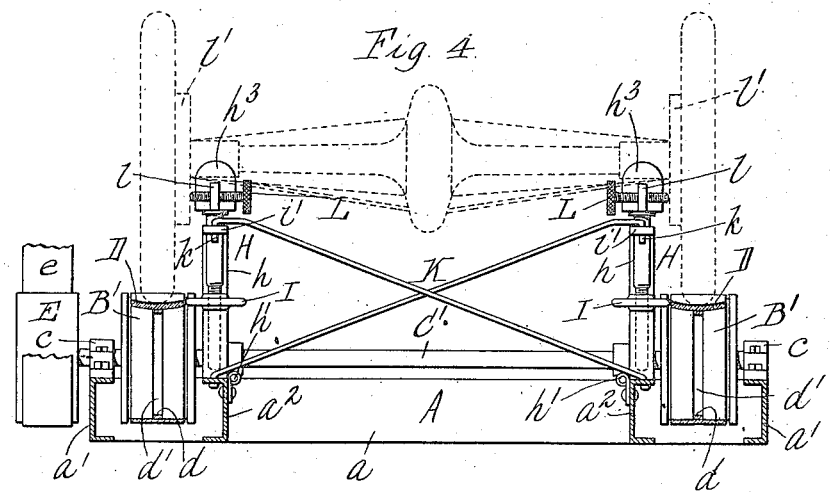

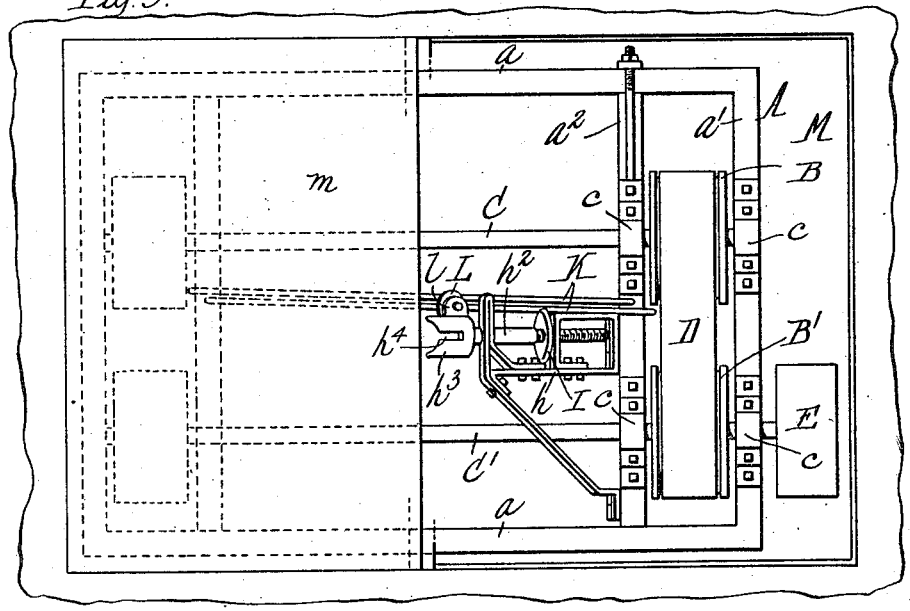
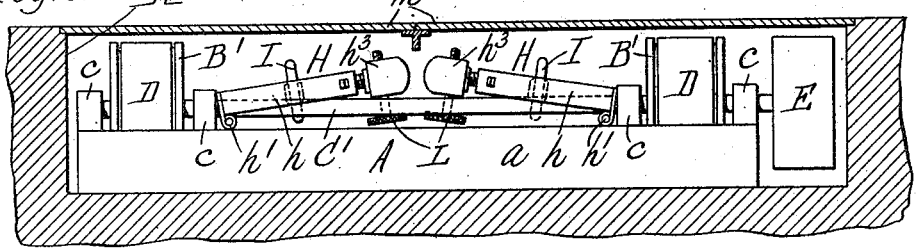

UNITED STATES PATENT OFFICE.

EDWARD M. LOGAN AND CLARENCE E. McNAUGHTON, OF SONYEA, NEW YORK.

POWER-TRANSMISSION MECHANISM FOR MOTOR-VEHICLES.

1,189,709.  Specification of Letters Patent.  Patented July 4, 1916.

Application filed March 7, 1914. Serial No. 823,061.

*To all whom it may concern:*

Be it known that we, EDWARD M. LOGAN and CLARENCE E. MCNAUGHTON, citizens of the United States, residing at Sonyea, in the county of Livingston and State of New York, have invented a new and useful Improvement in Power-Transmission Mechanisms for Motor-Vehicles, of which the following is a specification.

This invention relates to power transmission apparatus for use with motor propelled vehicles whereby the motor of the vehicle can be conveniently utilized for driving other machinery.

One object of the invention is to produce a practical and inexpensive transmission apparatus of this kind which is of a construction adapting it to be readily set up for use in any convenient place and which has means whereby the motor vehicle can be readily driven by its own power onto and retained in position thereon; also to provide simple and desirable means for securing the vehicle on the apparatus and relieving the transmission mechanism of a portion of the weight of the vehicle to thereby reduce the friction and wear on the same and on the vehicle tires; also to provide vehicle stop and securing means which when not in use are adapted to be moved to positions where they are out of the way; also to construct the apparatus so that it is adapted to be located in a pit or space below a floor and covered by trap doors when not in use, so as to be out of the way and not occupy floor space; and also to improve apparatus of this sort in the particulars hereinafter described and set forth in the claims.

In the accompanying drawings, consisting of three sheets: Figure 1 is a plan view of a power transmitting apparatus embodying the invention. Fig. 2 is a longitudinal sectional elevation thereof in line 2—2, Fig. 1. Fig. 3 is a fragmentary longitudinal sectional elevation thereof, on an enlarged scale, in line 3—3, Fig. 1. Fig. 4 is a rear elevation, partly in section, thereof, on a smaller scale than Fig. 3. Fig. 5 is a plan view showing the apparatus located in a pit beneath trap doors, one of the jacks being shown in its inoperative position through the open door. Fig. 6 is a sectional elevation of the apparatus in the pit.

Like reference characters refer to like parts in the several figures.

A represents the supporting frame or base of the apparatus, which, as shown, is rectangular in shape and composed of front and rear metal channel bars $a$ connected by similar end bars $a'$ and intermediate bars $a^2$. The frame can, however, be of any other suitable construction.

B B' represent pulleys which are journaled in pairs at opposite sides of the frame A in position to form rolling supports for the rear or driving wheels of a motor vehicle. Preferably the pulleys are secured between the end and intermediate bars of the frame A on parallel shafts C C' journaled in suitable bearings $c$ on the frame and each pair of pulleys is preferably connected by a belt D on which the wheels of the motor vehicle rest. The belts are adapted to be driven and to turn the pulleys B B' and shafts C C' by setting the vehicle wheels in motion by the usual controlling means of the vehicle. The belts D are preferably provided on their inner faces between their edges with longitudinal ribs $d$ adapted to engage in circumferential grooves $d'$ in the pulleys to prevent the belts from slipping off the pulleys due to the tendency of the edges of the belts to curl up on account of the pressure of the transversely convexed treads of the vehicle tires on the middle portions of the belts. The pulleys are also preferably provided with end flanges between which the belts are confined. The motion of the belts can be transmitted for any desired purpose by a pulley E on the shaft C' and a belt $e$, or by any other suitable means.

The transmission mechanism as thus far described is constructed and operates substantially like that disclosed in our copending application Serial No. 791,271, filed September 23, 1913.

F represents a way or track for guiding the vehicle into position on the transmission mechanism. As shown, this track is formed by horizontal grooved rails $f$ detachably secured to the frame A in line with the pulleys B B', and flanged inclines $f'$ connecting with the front ends of the rails $f$. The inclines $f'$ preferably increase in width forwardly and thus facilitate the guiding of the vehicle onto the rails $f$. The rear ends of the rails $f$ are detachably secured on the frame A, for instance, by pins $f^2$ on the rails entering holes in the frame and the front ends of the rails are similarly secured on a cross connecting bar $f^3$ by pins $f^4$. The inclines $f'$ are also preferably detachably connected to the front ends of the horizontal rails $f$ by suitable means, such as pins $f^5$ on the sides of the inclines seated in sockets $f^6$ on the sides of the rails $f$, see Fig. 1.

By detachably securing the guide track in position and constructing it of detachably connected parts, as described, it can be readily placed in position and removed so as to be out of the way and not occupy floor space when not in use. The disconnected parts can be easily handled by a single person. Means other than shown could be employed for detachably securing the guide track to the frame A and detachably connecting the parts thereof.

G G represent stops or bumpers located in rear of the pulleys B B' for preventing the vehicle from being accidentally backed off of the pulleys. Preferably each bumper has legs suitably pivoted at their lower ends at $g$ to the frame A so that the bumper can be folded down against the frame, as shown by dotted lines in Fig. 2, when not in use. A brace $g'$, pivoted at its lower end to the frame A and adapted to have its upper end removably seated in a socket in the bumper, holds the bumper in the upright position.

H H represent jacks or devices for securing the vehicle in place on the transmission mechanism and relieving the traction belts D to a greater or less degree from the weight of the vehicle. Each jack has a frame $h$ of any suitable construction which is suitably hinged at its lower end at $h'$ to the frame A so that it can be swung downwardly out of the way from its upright operative position, and a member $h^2$ which is vertically adjustable on the frame $h$ for engaging and lifting the vehicle. The lifting member $h^2$ shown has a head $h^3$ suitably shaped to fit the rear axle of the vehicle and a screwthreaded shank which passes through guides $i$ $i'$ on the frame $h$ and through the screwthreaded hole of a nut or wheel I which bears against the guide $i$. The head $h^3$ preferably has a transverse vertical slot $h^4$. When used with a vehicle in which the axle has a truss rod, the truss rod is adapted to enter this slot $h^4$ and permit the head to have a firm bearing against the rear axle casing. The jacks are releasably held upright by suitable means, such as cross brace-rods K having hooked lower ends confined in holes in the frame A and hooked upper ends $k$ adapted to be engaged in holes $k'$ in the upper ends of the jack frames $h$. By unhooking the upper ends of the brace rods and dropping them, the jacks can be swung downwardly toward each other from their upright position, as indicated in Figs. 5 and 6, so that they will be out of the way and will not interfere with the vehicle being moved into position on and off of the apparatus. After the vehicle is in position on the apparatus the jacks are raised to the upright position beneath the rear axle and secured. The lifting members $h^2$ are then raised by turning the nuts or wheels I and the rear end of the vehicle lifted until its wheels bear on the belts D only with sufficient pressure to give the required traction. The jacks thus relieve the tires of the vehicle wheels and the belts D of undue weight and wear, and in addition they serve to prevent the vehicle from shifting forwardly or rearwardly on the apparatus since the vehicle axle is confined in the socketed heads of the jacks. The adjustable members of the jacks also enable them to be properly engaged with the axle without lifting the vehicle, when this is desired.

L L represent horizontal screws which pass through screwthreaded holes in lugs or parts $l$ on the heads of the jacks. By turning these screws until they bear firmly against the brake disks $l'$ at the ends of the vehicle axle, the vehicle is securely held from shifting sidewise and working off of the belts D.

This invention is not restricted to the described construction of the jacks, and jacks of other construction adapted to be moved to and from the operative position and to be operated to engage or raise the vehicle can be used, and different means can also be employed for preventing the vehicle from shifting sidewise on the belts D.

Instead of using the apparatus on the floor and providing the guide as described, the frame A with the mechanism carried thereby can, if desired, be located in a pit M or space beneath the floor and covered by one or more trap doors $m$. When thus located and the jacks are swung downwardly from their upright positions, the trap doors can be closed, thus permitting the use of the floor above the apparatus. When the apparatus is used in a pit the bumpers G are not necessary and can be omitted if desired.

We claim as our invention:

1. In a power transmitting mechanism, the combination of a stationary supporting frame, pulleys mounted thereon and adapted to support and to be driven by the driving wheels of a motor vehicle, a track for guiding the vehicle onto said pulleys comprising horizontal guide rails which rest at their rear ends on and are detachably secured to said frame, a connecting bar which supports the main ends of the said rails, and inclines running from the front ends of said rails to the floor, and means for transmitting power from one of said pulleys.

2. The combination of a supporting frame, pulleys mounted thereon and adapted to support and to be driven by the driving wheels of a motor vehicle, and a track for guiding the vehicle onto said pulleys comprising separate horizontal guide rails detachably secured at their rear ends on said frame, a connecting bar on which said rails are detachably secured, and removable inclines at the front ends of said rails, substantially as set forth.

3. The combination of a supporting frame, pulleys mounted thereon and adapted to support and to be driven by the driving wheels of a motor vehicle, bumpers hinged to said frame in rear of said pulleys and in alinement therewith, and means for releasably securing said bumpers in operative position, substantially as set forth.

4. The combination of a supporting frame, pulleys mounted thereon and adapted to support and to be driven by the driving wheels of a motor vehicle, bumpers hinged to said frame in rear of said pulleys and in alinement therewith, braces pivoted to said frame and adapted to engage said bumpers for releasably holding the same upright, and means for transmitting power from one of said pulleys, substantially as set forth.

5. The combination of a supporting frame, pulleys mounted thereon and adapted to support and to be driven by the driving wheels of a motor vehicle, jacks movably connected to said frame to move from inoperative positions to upright operative positions, said jacks having vertically adjustable lifting members adapted to engage and lift a part of the vehicle and hold it in place so that the driving wheels of the vehicle are in position on the pulleys, and means for operating said lifting members.

6. The combination of a supporting frame, pulleys mounted thereon and adapted to support and to be driven by the driving wheels of a motor vehicle, and jacks movably connected to said frame to move to and from upright operative positions, said jacks comprising frame and lifting members which are adjustable vertically on said frame work into engagement with parts of the vehicle for holding the vehicle in place so that the driving wheels thereof are in position on the pulleys.

7. The combination of a supporting frame, pulleys mounted thereon and adapted to support and to be driven by the driving wheels of a motor vehicle, and jacks hinged to said frame to swing to and from upright position and having members which are adjustable into engagement with parts of the vehicle, and braces for releasably securing said jacks in upright position.

8. The combination of a supporting frame, pulleys mounted thereon and adapted to support and to be driven by the driving wheels of a motor vehicle, and jacks movably connected to said frame to move to and from upright operative positions, said jacks having members which are adjustable vertically into engagement with parts of the vehicle for holding the vehicle from movement lengthwise, and laterally adjustable members for holding the vehicle from movement sidewise.

9. The combination of a supporting frame, pulleys mounted thereon and adapted to support and to be driven by the driving wheels of a motor vehicle, and holding devices for the vehicle which are hinged to said frame to swing laterally downwardly toward each other from upright holding positions, and means for releasably securing said holding devices in upright position.

10. The combination of a supporting frame, pulleys mounted thereon and adapted to support and to be driven by the driving wheels of a motor vehicle, and jacks movably connected to said frame to move to and from upright operative positions, said jacks having heads adapted to engage the vehicle axle and provided with slots adapted to receive the axle truss rod.

Witness our hands, this 2nd day of March, 1914.

EDWARD M. LOGAN.
CLARENCE E. McNAUGHTON.

Witnesses:
    JEANIE L. KLECKLER,
    FRED W. HITCHCOCK.